No. 707,740. Patented Aug. 26, 1902.
C. J. WARREN.
BOTTLE WASHING MACHINE.
(Application filed Dec. 7, 1901.)
(No Model.) 7 Sheets—Sheet 1.

Witnesses:
Ira D. Perry
J. B. Weir

Inventor
Clinton J. Warren
by Bond, Adams, Pickard & Jackson
Attorneys

No. 707,740. Patented Aug. 26, 1902.
C. J. WARREN.
BOTTLE WASHING MACHINE.
(Application filed Dec. 7, 1901.)
(No Model.) 7 Sheets—Sheet 3.

No. 707,740. Patented Aug. 26, 1902.
C. J. WARREN.
BOTTLE WASHING MACHINE.
(Application filed Dec. 7, 1901.)
(No Model.)
7 Sheets—Sheet 7.

UNITED STATES PATENT OFFICE.

CLINTON J. WARREN, OF CHICAGO, ILLINOIS.

BOTTLE-WASHING MACHINE.

SPECIFICATION forming part of Letters Patent No. 707,740, dated August 26, 1902.

Original application filed May 16, 1901, Serial No. 60,524. Divided and this application filed December 7, 1901. Serial No. 85,004. (No model.)

*To all whom it may concern:*

Be it known that I, CLINTON J. WARREN, a citizen of the United States, residing at Chicago, in the county of Cook and State of Illinois, have invented certain new and useful Improvements in Bottle-Washing Machines, of which the following is a specification, reference being had to the accompanying drawings.

This invention relates to machines for washing bottles both on the inside and the outside, and has for its object to provide means for so washing bottles while the same are being moved forward by an endless carrier, the washing devices being moved for a limited distance parallel with the moving carrier and in engagement with the bottles carried thereby and upon the completion of such limited movement in the direction of the carrier being quickly moved in a reverse direction to be again carried forward with the carrier to operate upon another set of bottles on such carrier. I accomplish this by the means shown in the drawings and hereinafter specifically described.

That which I claim as new will be set forth in the claims.

The washing devices forming the subject-matter of this application are shown and described in my pending application, Serial No. 60,524, filed May 16, 1901, of which this is a division, in which said application is also shown various other sets of mechanism for operating upon bottles while in motion after said bottles have been subjected to the washing operation described herein.

In the accompanying drawings, Fig. 11ª is a detail of the driving-pinion and a portion of the large gear with which it meshes.

Referring to the figures of the drawings, in which corresponding parts are indicated by the same reference characters, 12 indicates supports at each end of the machine, upon which are secured two pairs of longitudinal beams 13 14, each pair having a suitable space between them to adapt the carrier, hereinafter described, to move freely in said space. The two pairs of longitudinal beams are located one above the other and are connected at their ends by curved pieces 15 15. The inner faces of each pair of beams 13 14 and the inner faces of the curved end pieces have formed therein deep grooves 16, in which the supporting-rollers of the carrier are adapted to travel. The carrier referred to is an endless one and is composed of a number of comparatively heavy blocks 17, each block having ears 18 at its ends through which pass axles 19 and upon the ends of which axles are journaled rollers 20, these rollers traveling, as stated, in the grooves in the inner faces of the beams 13 14 and their curved end pieces 15.

21 indicates a sprocket-wheel keyed to a shaft 22, mounted in suitable bearings secured between the longitudinal beams 13 14, near one end thereof. 23 indicates another shaft extending across the machine between the longitudinal beams referred to, suitably secured in bearings supported by the framework of the machine. Upon this shaft 23 is secured a pulley-wheel 24, over which a driving-belt 25 is adapted to pass. The shaft 23 carries a small gear-wheel 26, which is keyed thereto and which meshes with another and larger gear-wheel 27, which latter gear-wheel is secured upon a projecting end of the shaft 22, whereby upon the rotation of such larger gear-wheel the sprocket-wheel 21 is driven and by its engagement with the axles 19 of the carrier-wheels 20 moves such carrier forward. At the opposite end of the machine from that at which the devices just referred to are located is arranged another and similar sprocket-wheel 28, over which the carrier travels, this sprocket-wheel 28 being located on a shaft 29.

Figure 11:
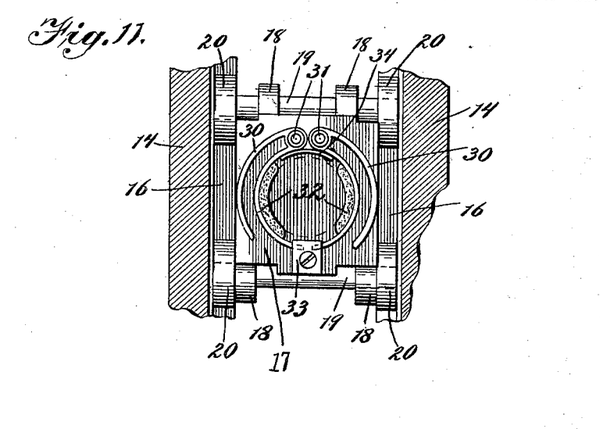
Fig. 11 is a plan view of one of the blocks of the endless carrier and one of the bottle-clamps carried thereby, a portion of the carrier-frame being also shown in section.

The outer face of each block 17 is provided with a suitable clamp adapted to receive the base of a bottle and hold such bottle firmly in position, so that it will at all times have its neck end projected outward. The form of clamps shown consists of two similar curved metal bands 30, each portion being bent on itself and at the bent portions secured to the block 17 by a screw or other pivot 31. The curvature of each portion of the clamp is such as to adapt it to conform to the curvature of the bottle intended to be held, and it is provided on its inner face, as shown, with two oppositely-arranged cushions 32, one of such cushions being provided for each portion of the clamp. The acting portion of the clamp, as shown, forms nearly a complete circle, the two ends approaching closely to each other and working back and forth beneath a bracket 33 when pressure is applied to or released from the sides of the clamp. The outer ends of each portion of the clamp bear against the sides of the beams 13 with sufficient force to cause the cushions 32 to grasp the bottle firmly, so as to hold it securely whether the bottle be upright or inverted. Suitable means may be provided for automatically inserting the bottles within the clamp and disengaging them therefrom, so as to be discharged from the machine, and such means are shown and described in my said pending application; but as they form no part of my present invention and, so far as my present invention is concerned, may be of any suitable character I have not shown nor described them herein. In the form of bottle-clamp shown the two portions 30 are adapted to be forced apart at the releasing-point by the action of a flat curved spring 34, secured at one end to one of the parts 30 and bearing at its other end against the other corresponding part 30. (See Fig. 11.)

With a series of bottles mounted and held upon the endless carrier with their neck ends projected, as explained, and such endless carrier with the bottles thereon continuously driven at a comparatively slow rate of speed the washing of the bottles both on the inside and the outside is accomplished by the means that I shall now describe.

Figure 6:
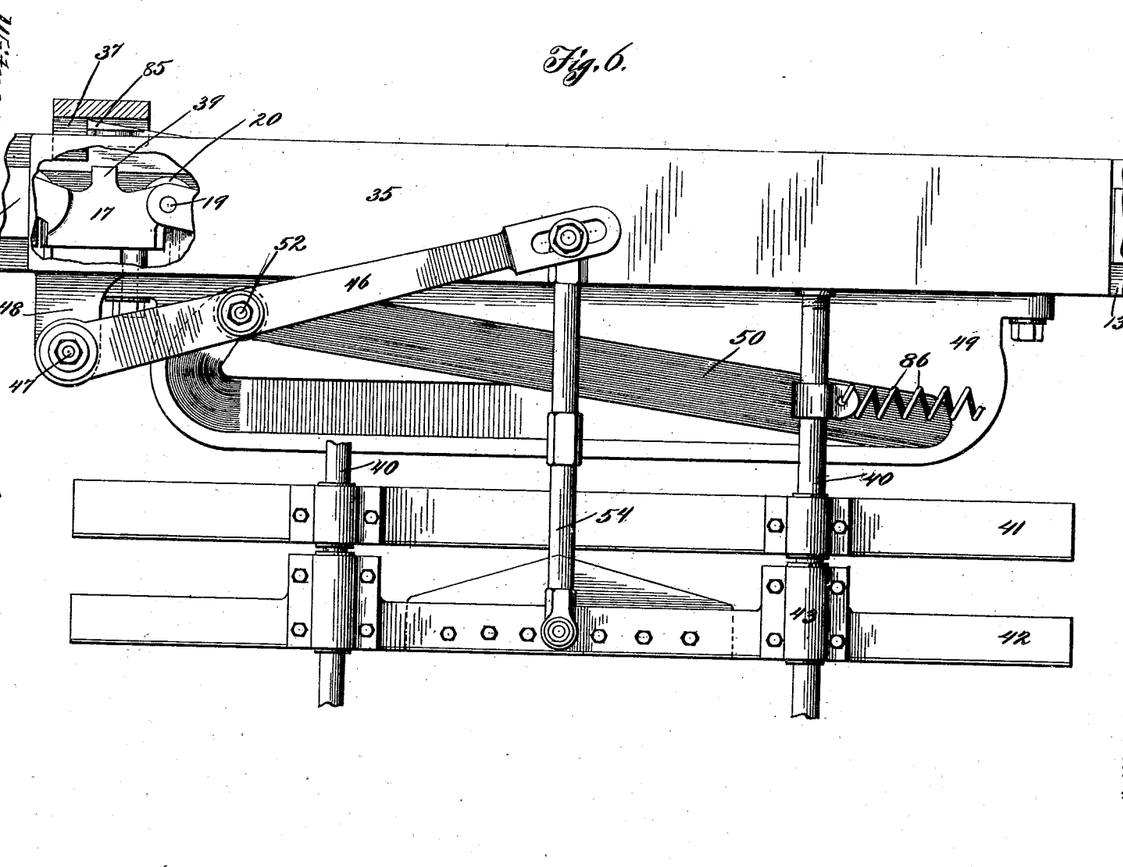
Fig. 6 is a side elevation of the movable frame on which the bottle-cleaning devices are carried, a small portion of the slide and the side of the bottle-carrier frame being broken away to show the means by which the frame is engaged by the carrier.
Figure 9:
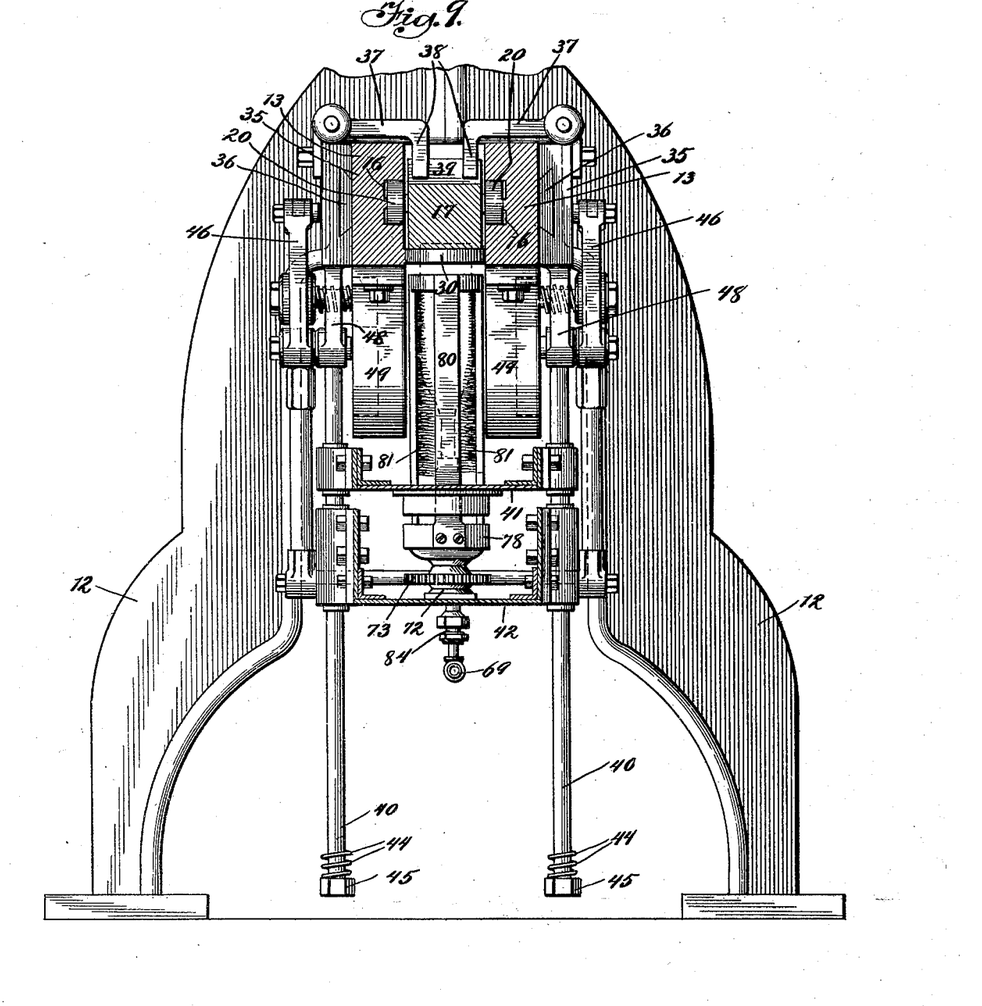
Fig. 9 is a cross-section on line 9 9 of Fig. 1.
Figure 10:
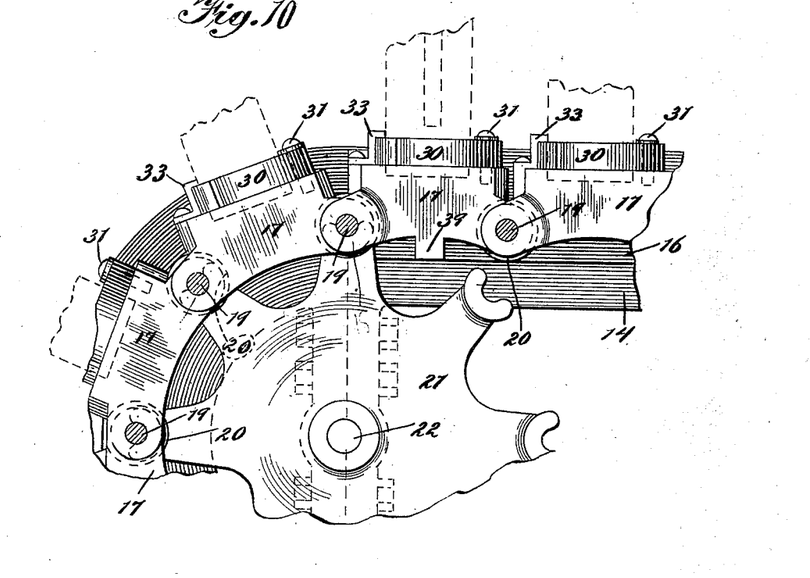
Fig. 10 is a detail showing a portion of the endless carrier and the sprocket-wheel for driving the same.

35 indicates a slide adapted to move back and forth horizontally to a limited extent on a fixed guide 36, secured upon the outer face of the longitudinal beam 13. The slide 35 carries a pivoted dog 37, which extends from the upper face of the beam 13 and has a downwardly-projecting portion 38, which is adapted to be engaged by a squared tooth 39, carried by one of the blocks 17 of the carrier. (See Figs. 6 and 7.) Each block of the carrier is not to be provided with one of these squared teeth; but about every fourth or fifth block will be, accordingly as the machine is timed. These slides and attached parts for moving the bottle-washing devices are duplicated for each side of the machine, as will be seen by reference to Fig. 9; but a description of one side only will suffice to explain the construction and operation.

40 indicates depending vertical rods secured at their upper ends to the lower face of the slide 35.

41 indicates a wide channel-plate rigidly affixed to the vertical rods 40, the location of such plate on the rods being, as shown, a short distance below the heads of the depending bottles that are carried by the endless carrier. 42 indicates another wide channel-plate, to which are affixed at its sides sleeves 43, through which the rods 40 pass, this channel-plate 42 being adapted to be moved up and down on the rod 40, as hereinafter explained. The lower ends of the rods 40 are provided with coiled springs 44, held against removal by nuts 45, which springs serve to prevent shock or jar when the plate 42 is moved to its lowest position.

46 indicates a lever pivoted at one end by a pivot 47 to a depending bracket 48, carried by the slide 35.

Figures 7, 8:
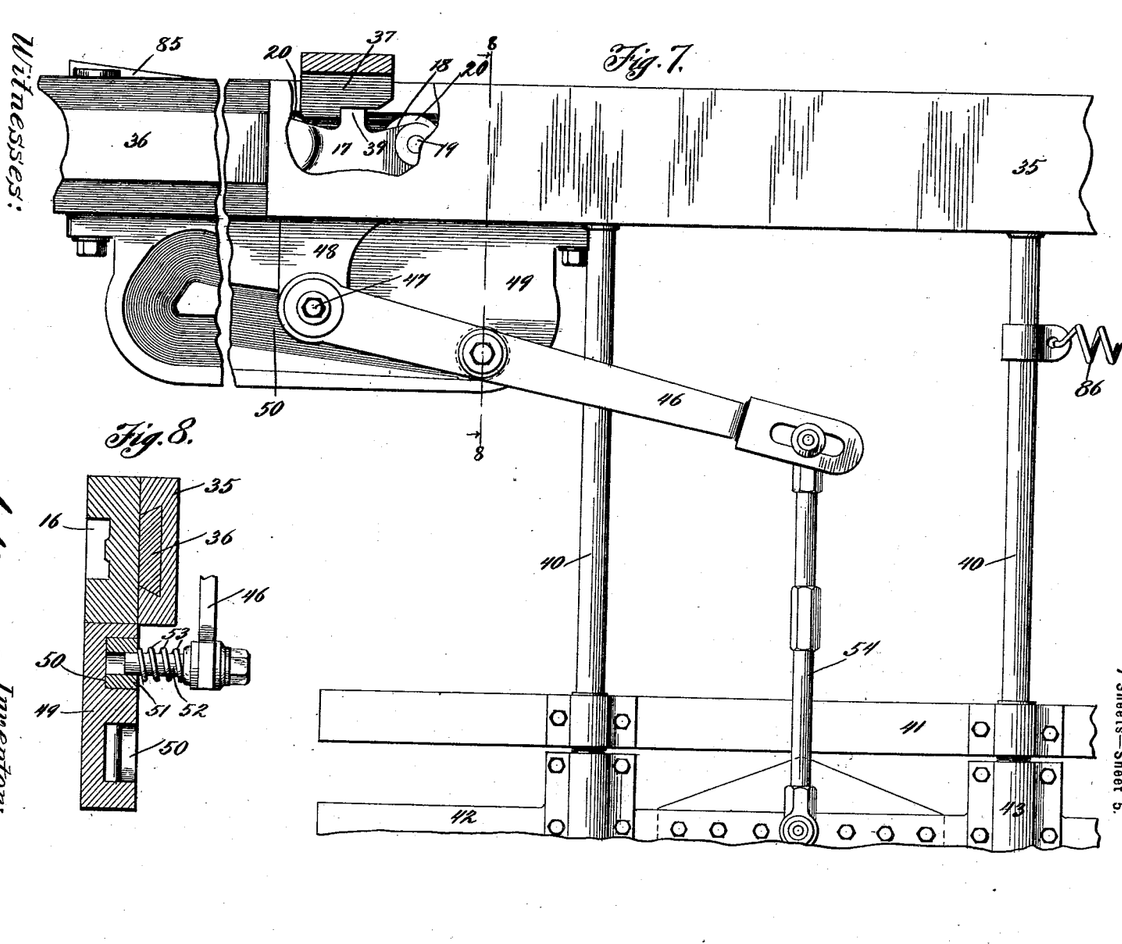
Fig. 7 is a view similar to that of Fig. 6 with the frame in its lowered position and partly broken away.
Fig. 8 is a cross-section taken at line 8 8 of Fig. 7.

49 indicates a comparatively thick plate bolted to the under side of the longitudinal beam 13 and having in its outer face a wide groove 50, in which travels a roller 51, loosely mounted on a pin 52, projecting inwardly from the pivoted lever 46. This groove 50, in which the roller 51 travels, extends upward diagonally from the forward end of the plate 49 to nearly the opposite end and upper edge of said plate and then extends downwardly and diagonally (the diagonal being in the direction of the travel of the carrier) and then on a horizontal line until it runs into the upward diagonal portion referred to. The horizontal portion for about one-half of its length and commencing from about its juncture with the curved end portion decreases in depth, as indicated by the vertical shaded lines and also as indicated in the lower portion of Fig. 8, until about the center of the length of the groove is reached, and from there on the depth of the groove is uniform and parallel with the face of the plate 49. The effect of this construction is that the roller 51, that travels in the groove 50, is forced outward when it reaches the inclined portion of the lower part of the groove and remains partially outward while it is traveling the rest of the distance in its horizontal path. Upon reaching the end of the horizontal path it will be shot into the upwardly and forwardly inclined portion of the groove by a coiled spring 53, that is carried by the pin 52, the coiled spring bearing, as shown in Fig. 8, against the side of the lever 46 and the side of the roller 51.

54 indicates a rod secured at its lower end to the vertically-movable channel-plate 42 and adjustably pivoted at its upper end to the lever 46. Upon the vertically-movable channel-plate 42 are rigidly secured hollow supports 55, through which pass hollow nipples 56, upon which are secured small gear-wheels 57. Directly over each one of these hollow nipples is a short section of pipe 58, that passes through a suitable opening in the channel-plate 41, such short pipe having affixed at its upper end a concave cup 59, adapted to fit over the end of an ordinary bottle. Surrounding each of the sections of pipe 58 is a short sleeve 60, affixed to and depending from the lower side of the channel-plate 41, and within the sleeve 60 the pipe 58 has a limited vertical play, its downward movement being stopped by its concave cup 59 and its upward movement being controlled by a head 61 on its lower end that comes in contact with the lower end of the sleeve 60.

62 indicates gear-wheels, one being interposed between each set of gear-wheels 57 and meshing therewith, each set of such gear-wheels 62 being rotatably mounted on a base 63. Fixedly secured to each gear-wheel 62 and rising vertically therefrom is a long screw 64, the thread thereof having a sharp pitch. Surrounding each of said screw-threads is a long sleeve 65, screw-threaded on its interior to correspond with the pitch of the screw 64, said sleeve being rigidly secured to the channel-plate 41 and extending, as shown, both above and below the base of such channel-plate.

Figures 1, 1A:
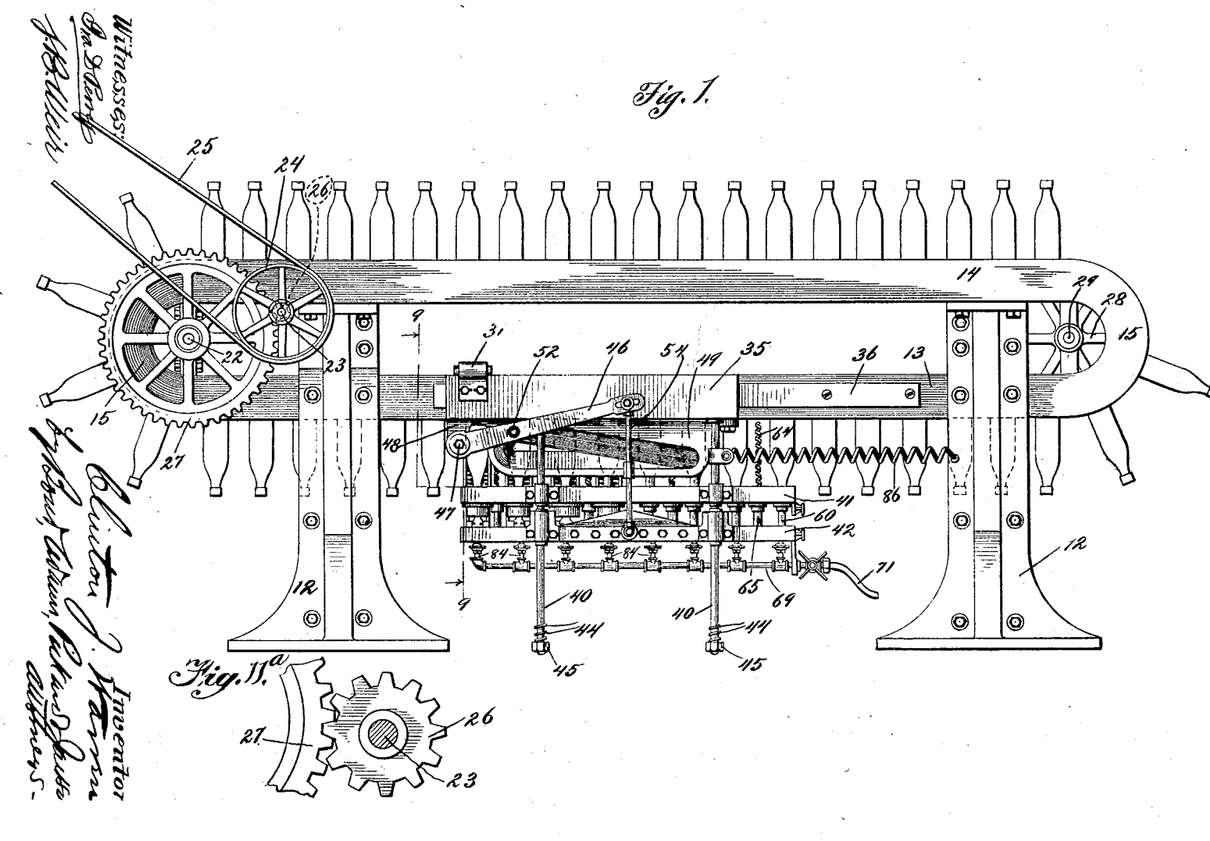
Figure 1 is a side elevation.
Figure 2:
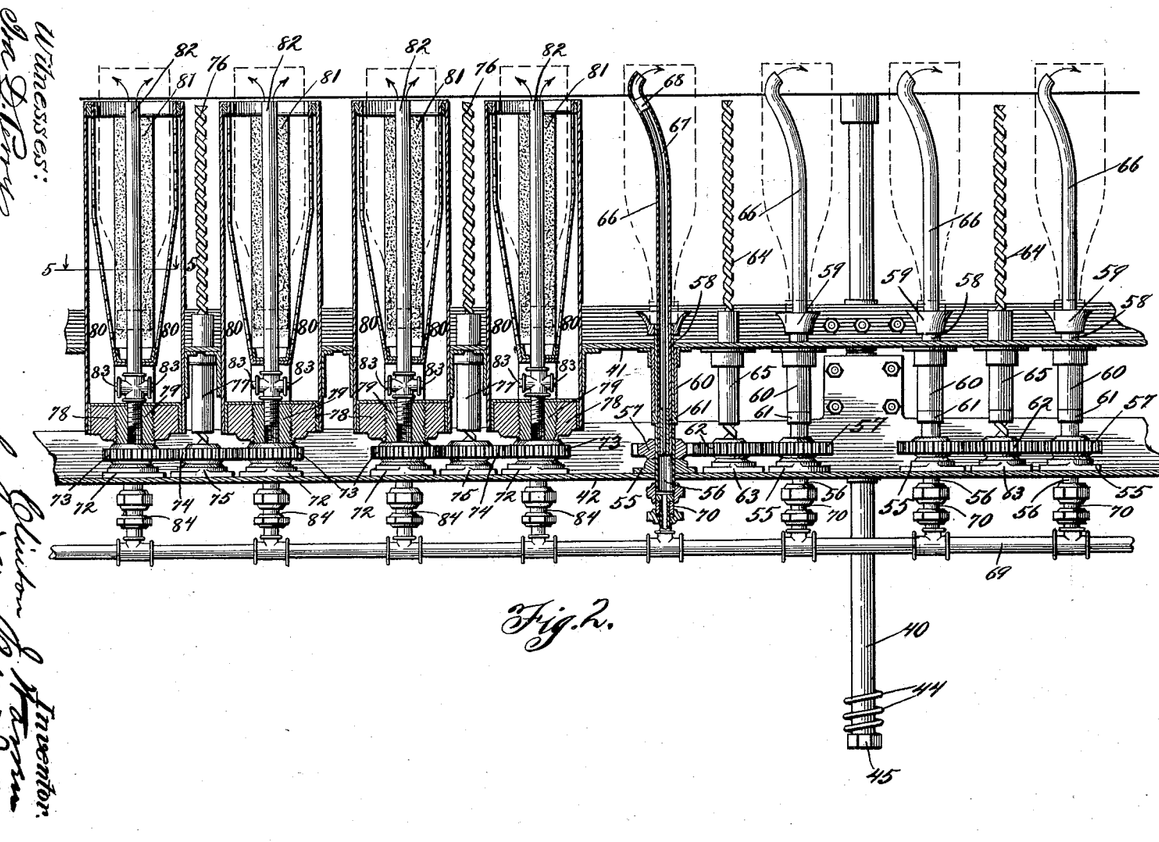
Fig. 2 is a longitudinal vertical section through the bottle-cleaning devices, said devices being in position to operate upon a series of bottles and such series of bottles being indicated in dotted lines.
Figure 3:
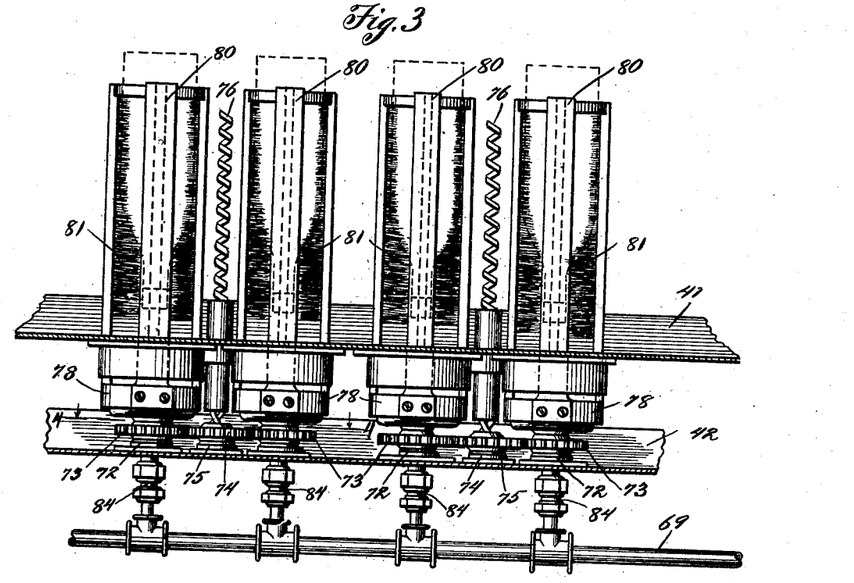
Fig. 3 is a side elevation of that portion of the bottle-cleaning devices shown at the left-hand side of Fig. 2.
Figure 4:
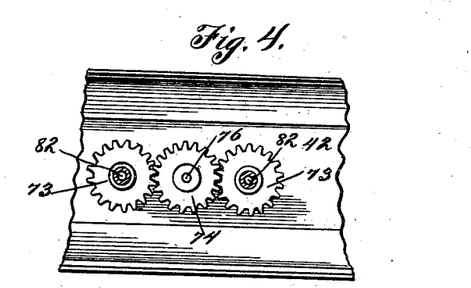
Fig. 4 is a horizontal section at line 4 4 of Fig. 3.

66 indicates a piece of flexible tubing passing through the short section of pipe 58. The lower end of this piece of tubing projects into and is attached to the hollow nipple 56, so that when the channel-plate 42 is moved downward, as hereinafter described, such tubing will be drawn down therewith and its upper end remain in the short section of pipe 58. Within each piece of flexible tubing is a piece of small spring-wire carrying at its upper end a hollow head 68. This wire is for the purpose of supporting the tubing when it is forced out beyond the pipe 58, as shown, the wire being slightly bent or curved at its upper portion and thereby giving a corresponding bend or curve to the tubing, so that as water emerges therefrom it will be better thrown toward the side of the bottle. Below the channel-plate 42 runs a water-supply pipe 69, from which through suitable connections 70 water is forced through the hollow nipple 56 and flexible tube 66 to the interior of a bottle when the parts are in the position shown in Fig. 2. As this water-pipe moves with the channel-plate 42, it is necessary, of course, to have a flexible connection uniting it with the source of supply, and such a connection is shown in Fig. 1 and indicated by 71.

Before describing the operation of the devices just referred to—that being the washing of the interior of a bottle—I will describe the other washing devices whereby the exteriors of the bottles are washed and an added washing or rinsing given to the interior. I do this because these second washing devices are carried by the same movable channel-plate 42, and therefore move with and operate at the same time as the first-described washing devices, though of course on another set of bottles.

72 indicates two pairs of hollow supports, each having loosely mounted thereon a gear-wheel 73, an intermediate gear-wheel 74 being provided between each pair of gears 73, being similar in this respect to the gears and supports previously described for the other washing devices. Each gear-wheel 74 carries an upwardly-projecting screw 76, which passes through properly-screw-threaded sleeves 77, projecting above and below the central portion of the channel-plate 41.

Figure 5:
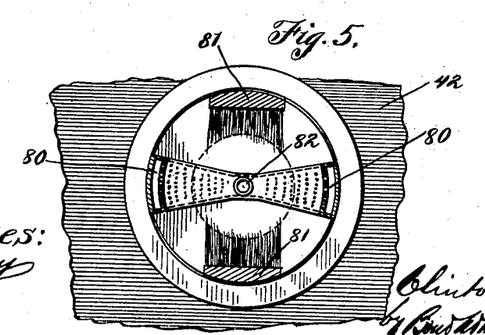
Fig. 5 is a cross-section at line 5 5 of Fig. 2.

78 indicates a base-block screw-threaded, as shown, or otherwise secured to a hollow hub 79 on the upper face of each gear-wheel 73. From opposite sides of each base-block is extended upward a water-distributer 80, the inner wall of which is perforated, as clearly shown in Figs. 2 and 5, to permit water to be discharged therefrom against a bottle lying between the two oppositely-located distributers. Between these two distributers and also oppositely arranged to each other are two vertically-arranged brushes 81, each adapted to contact with the bottle upon which water is being thrown by the pair of distributers 80. The shape of the water-distributers and brushes is adapted to the shape of the bottle being cleaned, being for that purpose, as shown, wider at the lower end, where they come opposite the neck of the bottle, than at the upper end, where they are opposite the body of the bottle.

83 indicates a pipe connected at its lower end to the hollow hub 79 and provided just above its point of connection with the hollow hub with a connection 83, that admits water to each of the water-distributers 80. Water is admitted through the hollow hub 79 to the pipe 83 through suitable connections 84, extending down and connected to the main supply-pipe 69.

In operation with the blocks 17 of the carrier each carrying clamped thereto a bottle and with the carrier driven by means of the sprocket-wheel on the shaft 22, as hereinbefore described, when a block of the carrier that has thereon a projection 39 is advanced sufficiently far to engage the dog 37 on the slide 35 such slide will be pulled along on its guide 36, carrying with it, of course, the pivoted lever 46. As the lever moves the roller 51, carried thereby, moves upward in the long upper diagonal portion of the groove 50, the end of the lever attached to the connecting-rod 54 rising, of course, until it reaches the position indicated in Fig. 6, which movement carries up the channel-plate 42 and its attached parts, such channel-plate and the upper channel-plate 41 (which latter does not move vertically) being both carried along with the movement of the slide 35 at the same time that the upward movement of the channel-plate 42 takes place. As the channel-plate 42 moves upward the pieces of flexible tubing 66 are brought opposite the open mouths of one set of bottles and forced up into such set of bottles, and the water-distributers and brushes are brought up so as to surround another set of bottles. Water passing from the main water-supply pipe 69, as heretofore described, is supplied to the interior and exterior of the bottles. The vertical screws 64 and 76 are attached, as stated, to the bases that are carried by the channel-plate 42, and as the screws are forced through the stationary sleeves 65 and 77, respectively, that are carried by the channel-plate 41, the effect, of course, is to turn the respective gear-wheels 62 and 74, that are attached, respectively, to said screws, and as these gears mesh with the gears attached to the washing devices such washing devices—namely, the tubes 66, the water-distributers 80, and the brushes 81— are of course rotated, and thereby effect a thorough washing both inside and outside of the bottles. As the channel-plate 42 rises the upper end of each hollow nipple 56 contacts with the enlarged lower portion of one of the pipes 58, forcing such pipes up slightly and bringing the cups 59 on the upper ends of such pipes against the projecting heads of the bottles. When the carrier is moved far enough to bring the roller 51 on the lever 46 to the limit of the long diagonal portion of the groove 50, the dogs 37 are disengaged from the carrier by a cam 85 on top of the longitudinal beams 13, upon which cam each dog rises, freeing itself from the upward extension 39 on the carrier-block. At the time of this disengagement in the manner described the roller 51 is ready to pass down the short inclined portion of the groove, and as soon as that action commences the connecting-rod 54 of course commences to descend and with it the channel-plate 42, and immediately the concave cups 59, bearing against the bottle ends, are stopped against the central portion of the channel-plate 41. The portion of the groove connecting the long upper and lower portions thereof is inclined, as heretofore stated, in the direction of the line of travel of the carrier, which is for the purpose of allowing the withdrawal of the cleaning devices that enter and surround the bottles while such bottles are moving. By the time the roller 51 gets to the lower portion of the groove the washing devices are clear of the bottles and the channel-plate 42 is in its lowermost position, and it is quickly retracted by a suitable spring 86, attached at one end to one of the vertical rods 40 and at the other end to one of the upright supports 12. Immediately after its retraction the dogs 37 are engaged by another projection 39 on one of the other blocks of the carrier and the operation repeated, a fresh set of bottles being operated upon by the devices employing the flexible tubes 66 and the second set of washing devices—that is, the set employing the distributers 80 and brushes 81—operating upon the set of bottles that had just been previously cleaned on the inside by the devices employing said flexible tubes.

By my invention I am enabled to thoroughly cleanse a series of bottles both interiorly and exteriorly while such bottles are moving forward through the machine without the stoppage at any time of the movement of such bottles, and therefore prepare them for filling, which manner of cleaning them is a rapid and economical one and one of especially great value when used in connection with other devices or sets of devices such as shown and described in my pending application for performing other operations upon the said bottles while moving.

That which I claim as my invention, and desire to secure by Letters Patent, is—

1. The combination with a carrier, and a clamping device attached thereto and adapted to hold a bottle, of means for moving said carrier, bottle-cleansing devices, means for carrying the bottle-cleansing devices, means for moving said bottle-cleansing devices toward the bottle to be cleaned so that the cleansing devices are brought into operative position, means for moving the bottle-cleansing devices for a limited distance parallel with the moving carrier, means for operating said cleansing devices, and means for withdrawing the cleansing devices from operative position, substantially as specified.

2. The combination with a carrier adapted to receive and hold a bottle with its neck end projected beyond the carrier, of means for moving said carrier, reciprocating mechanism carrying a water-conducting tube adapted to enter the bottle, means for conveying water to said tube, means for moving said reciprocating mechanism toward the bottle to cause the water-conducting tube to enter therein, means for moving said mechanism for a limited distance parallel with the moving carrier, and means for drawing the said mechanism away from the bottle and withdrawing the said tube from the interior of the bottle, substantially as specified.

3. The combination with a carrier adapted to receive and hold a bottle with its neck end projected, of means for moving said carrier, a plate carrying a water-conducting tube adapted to enter the bottle, means for supplying water to and through said tube, means for moving said plate toward the bottle to cause the water-conducting tube to enter therein, means for rotating the water-conducting tube while in the bottle, means for moving the said plate for a limited distance parallel with the moving bottle-carrier, and means for drawing the plate away from the bottle and withdrawing the said tube from the interior thereof, substantially as specified.

4. The combination with a carrier adapted to receive and hold a bottle with its neck end projected, of means for moving said carrier, a plate carrying a water-conducting tube adapted to enter the bottle, means for moving said plate toward the bottle to cause the water-conducting tube to enter therein, a rotatable gear carried by said plate and adapted when turned to rotate said water-conducting tube when in the bottle, means for rotating said gear, means for moving the plate for a limited distance parallel with the moving carrier, and means for drawing the plate away from the bottle and withdrawing the said tube from the interior thereof, substantially as specified.

5. The combination with a carrier adapted to receive and hold a bottle with its neck end projected, of means for moving said carrier, a plate carrying a water-conducting tube adapted to enter the bottle, means for moving said plate toward the bottle to cause the water-conducting tube to enter therein, a gear-wheel secured to said water-conducting tube and carried by said plate, a second gear-wheel also carried by said plate and meshing with the first-named gear-wheel, a screw-threaded rod carried by said second-named gear-wheel, a fixed threaded sleeve through which said screw-threaded rod passes, whereby as said rod is moved through said sleeve motion will be imparted to the said gear-wheels, means for moving the plate for a limited distance parallel with the moving bottle-carrier, and means for drawing said plate away from the bottle and withdrawing the said water-conducting tube from the interior thereof, substantially as specified.

6. The combination with a carrier adapted to receive and hold a bottle with its neck end projected, of means for moving said carrier, a movable frame carrying a water-conducting tube adapted to enter a bottle, a guide carried by said frame through which said water-conducting tube is adapted to pass and be supported, means for moving said frame toward the bottle to cause the water-conducting tube to enter therein, means for moving said frame for a limited distance parallel with the moving bottle-carrier, and means for drawing the frame away from the bottle and withdrawing the said water-conducting tube from the interior thereof, substantially as specified.

7. The combination with a carrier adapted to receive and hold a bottle with its neck end projected, of means for moving said carrier, a frame carrying a flexible water-conducting tube adapted to enter a bottle, a guiding and supporting rod within said flexible tube, means for moving said carrier toward the bottle to cause the water-conducting tube to enter therein, means for moving the frame for a limited distance parallel with the moving bottle-carrier, and means for drawing the frame away from the bottle and withdrawing the said flexible tube and its interior guiding and supporting rod from the interior of the bottle, substantially as specified.

8. The combination with a carrier adapted to receive and hold a bottle with its neck end projected, means for moving said carrier, and a frame consisting of an upper and a lower part, both adapted to move in the direction of travel of the carrier, and the lower part having an independent vertical movement, of a water-conducting tube adapted to enter a bottle, said tube being carried by the lower part of the frame, a guide attached to the upper part of the frame, through which guide the water-conducting tube is adapted to pass, means for moving said frame with the line of travel of the carrier, means for moving the lower part of said frame at the same time toward the bottle to cause the water-conducting tube to enter therein, and means for drawing the frame away from the bottle and withdrawing the said tube from the interior thereof, substantially as specified.

9. The combination with a carrier adapted to receive and hold a bottle with its neck end projected, means for moving said carrier, and a frame consisting of an upper and a lower part, both adapted to move in the direction of travel of the carrier, and the lower part having an independent vertical movement, of a water-conducting tube adapted to enter a bottle, said tube being carried by the lower part of the frame and projecting through the upper part of the frame, means for moving said frame in the direction of the line of travel of the carrier, means for moving the lower part of said frame at the same time toward the bottle to cause the water-conducting tube to enter therein, and means for drawing the frame away from the bottle and withdrawing the said tube from the interior thereof, substantially as specified.

10. The combination with a carrier adapted to receive and hold a bottle with its neck end projected, means for moving said carrier, and a frame consisting of an upper and a lower part, both adapted to move in the direction of travel of the carrier, and the lower part having an independent vertical movement, of a water-conducting tube adapted to enter a bottle, said tube being carried by the lower part of the frame, a sleeve surrounding said water-conducting tube and located in an opening in the upper part of the frame and provided on its upper end with a head adapted to fit over the head of a bottle, means for moving said frame within the line of travel of the carrier, means for moving the lower part of said frame vertically, a device for forcing up the said sleeve to cause the head thereon to come over the head of the bottle on said carrier, means for directing the water-conducting tube into the bottle as the lower part of the frame rises, and means for drawing the frame away from the bottle and withdrawing the said tube from the interior thereof, substantially as specified.

11. The combination with a carrier adapted to receive and hold a bottle, of means for moving said carrier, a frame, bottle-cleansing devices carried by said frame, means for moving said frame toward the bottle to be cleansed so that the cleansing devices are brought into operative position, means carried by the carrier for moving the bottle-cleansing devices with the movement of the carrier for a limited distance, means for moving the bottle-cleansing devices away from the bottle, and means for releasing the engagement between the carrier and the frame that carries the bottle-cleansing devices, substantially as specified.

12. The combination with a carrier adapted to receive and hold a bottle, means for moving said carrier, a frame, and bottle-cleansing devices carried by said frame, of means for moving said frame toward the bottle to be cleansed so that the cleansing devices are brought into operative position, means carried by the carrier for moving the bottle-cleansing devices with the movement of the carrier for a limited distance, means for moving the bottle-cleansing devices away from the bottle, means for releasing the engagement between the carrier and the frame that carries the bottle-cleansing devices, and means for returning said frame after its disengagement from the carrier, said frame on its return moving in a direction opposite to that of the travel of the carrier, substantially as specified.

13. The combination with a carrier adapted to receive and hold a bottle, means for moving said carrier, a slide adapted to move for a short distance parallel with said carrier, bottle-cleansing devices, and a frame adapted to carry said bottle-cleansing devices, of means for causing said frame to travel toward the bottle on the carrier to bring the bottle-cleansing devices into operative position, an engaging device on the movable carrier, a pivoted dog carried by the slide and adapted to be engaged by the engaging device of the carrier, whereby said slide and attached frame can move with the carrier, a device for lifting said pivoted dog out of engagement with the carrier, and means for forcing the said frame away to carry the bottle-cleansing devices out of operative position, substantially as specified.

14. The combination with a carrier adapted to receive and hold a bottle, of a slide adapted to be engaged by the carrier and move therewith, a frame secured to said slide, a lever pivotally connected at one end with the slide and at the other end with the said frame, a fixed plate having a groove in the face thereof, the upper portion of said groove being diagonal and the lower portion horizontal, a roller carried by said lever and adapted to travel in said groove, and means for disengaging the slide from the moving carrier, substantially as specified.

15. The combination with a carrier adapted to receive and hold a bottle, of a slide adapted to be engaged by the carrier and move therewith, a frame secured to said slide, a lever pivotally connected at one end with the slide and at the other end with the said frame, a fixed plate having a groove in the face thereof, the upper portion of said groove being diagonal and the lower portion horizontal, a roller adapted to travel in said groove, said roller being loosely mounted on a pin projecting from the side of said roller and being held in position by a coiled spring around said pin between said roller and lever, and a device for disengaging the slide from the moving carrier, substantially as specified.

16. The combination with a carrier adapted to receive and hold a bottle, of a slide adapted to be engaged by the carrier and move therewith, a frame secured to said slide, a lever pivotally connected at one end with the slide and at the other end with the said frame, a fixed plate having a groove in the face thereof, the upper portion of said groove being diagonal and the lower portion horizontal, a roller adapted to travel in said groove, said roller being rotatably secured to said lever, and a device for disengaging the slide from the moving carrier, substantially as specified.

17. The combination with a carrier adapted to receive and hold a bottle, of means for moving said carrier, devices for cleaning the outside of the bottle, a frame for carrying said cleaning devices, means for moving said frame toward the bottle to cause the bottle-cleaning devices to be brought into operative position opposite the bottle, means for moving said frame for a limited distance parallel with the moving bottle-carrier, and means for drawing the said frame away from the bottle and withdrawing from operative position the said bottle-cleaning devices, substantially as specified.

18. The combination with a carrier adapted to receive and hold a bottle, of means for moving said carrier, devices for throwing water against the outer surface of the bottle, a frame for carrying said water-throwing devices, means for moving said frame toward the bottle to cause the water-throwing devices to be brought opposite said bottle, means for moving the frame for a limited distance parallel with the bottle-carrier, and means for drawing the frame away from the bottle and thereby withdrawing the said water-throwing devices out of operative position, substantially as specified.

19. The combination with a carrier adapted to receive and hold a bottle, of means for moving said carrier, a cleaning-brush adapted to contact with the outside of the bottle, a frame for carrying said brush, means for rotating said brush while in contact with the bottle, means for moving the frame for a limited distance parallel with the moving bottle-carrier, and means for drawing the frame away from the bottle and withdrawing the said brush from contact therewith, substantially as specified.

20. The combination with a carrier adapted to receive and hold a bottle, of means for moving said carrier, a device for discharging water against the outside of the bottle, a brush adapted to be brought in contact with the outside of the bottle, a frame for carrying both said water-discharging device and brush, means for moving said frame toward the bottle in order to bring said water-discharging device and brush into operative position with reference to the bottle, means for rotating said water-discharging device and brush, means for moving the frame for a limited distance parallel with the moving bottle-carrier, and means for drawing the frame away from the bottle and withdrawing the said water-discharging device and brush from operative position with reference to the bottle, substantially as specified.

CLINTON J. WARREN.

Witnesses:
HELEN M. COLLIN,
ALVY L. ROMME.